Patented Dec. 24, 1929

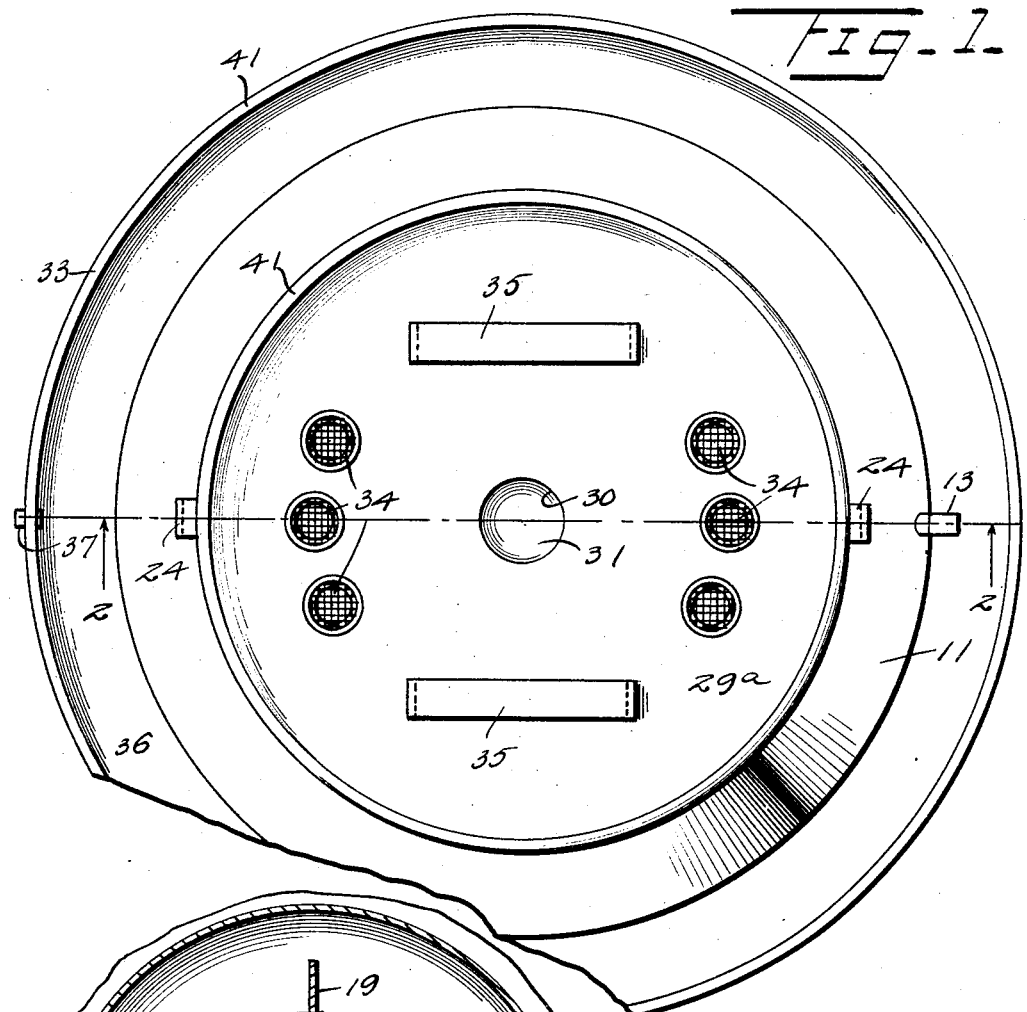
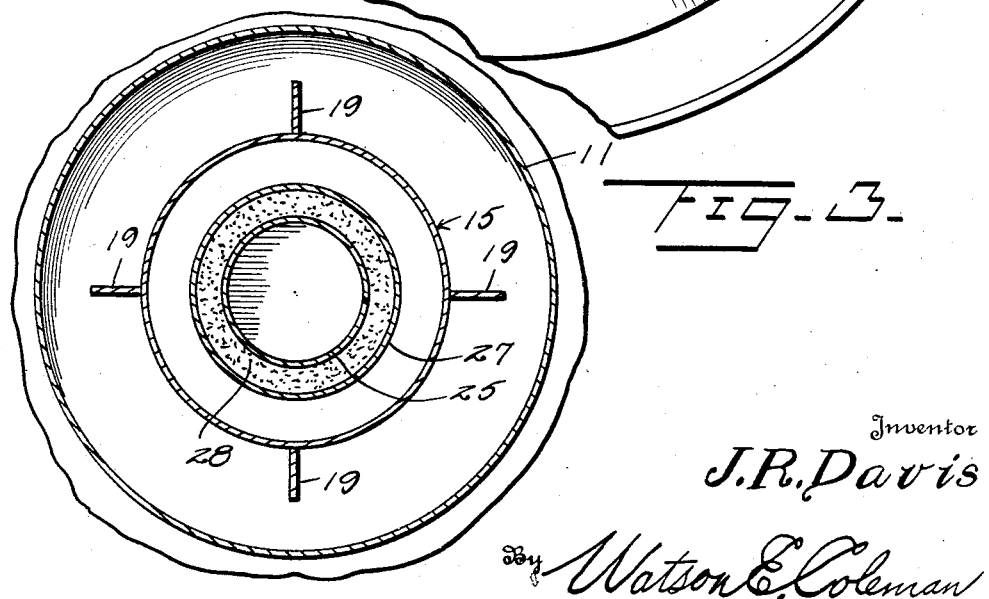

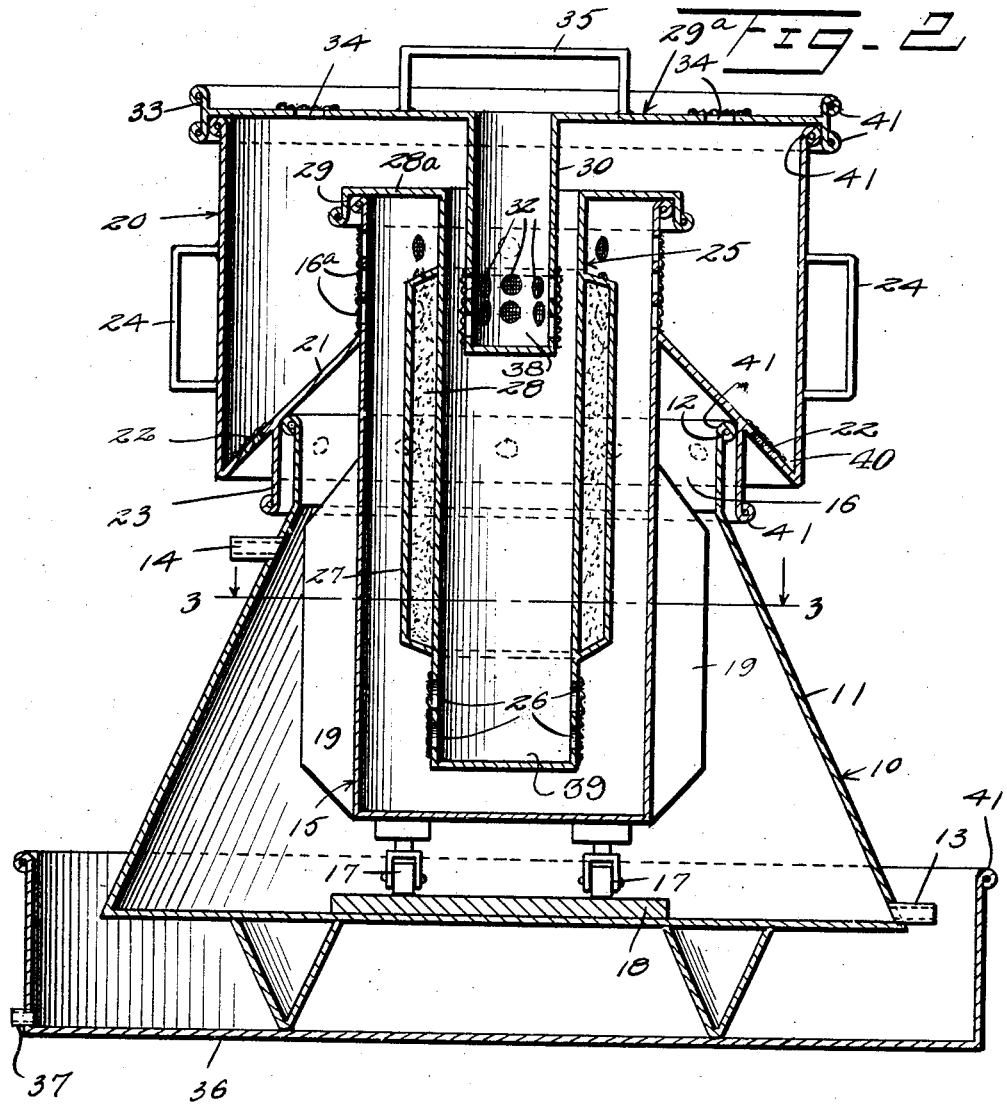

1,740,646

UNITED STATES PATENT OFFICE

JAMES RILEY DAVIS, OF NEWPORT, VERMONT

MILK-COOLING APPARATUS

Application filed August 4, 1928. Serial No. 297,488.

This invention relates to milk cooling apparatus and more particularly to an apparatus through which milk may be passed prior to its placement in shipping cans to remove animal heat therefrom.

An important object of the invention is to produce a device of this character which is so constructed that a maximum contact of the milk with the walls of a cooling chamber, which is provided, may be had and, at the same time, a simple apparatus provided.

A further and more specific object of the invention is to provide a chamber for the reception of cooling fluid and in combination therewith a container for insertion therein, in which the milk is introduced at the lower end and caused to travel upwardly along the outer wall, so that it is in contact with the fluid cooled wall during its travel.

A further object of the invention is to provide in a structure of the character just described an arrangement such that the milk, after its upward travel along the cooled wall of the inserted chamber, is delivered to the outer wall of the cooling chamber to pass thereunder, so that it is cooled a second time.

A further object of the invention is to combine the structure of a cooling apparatus of this character with means for straining and cleansing the milk as it is passed therethrough.

These and other objects I attain by the construction shown in the accompanying drawings, wherein for the purpose of illustration is shown a preferred embodiment of my invention and wherein:—

Figure 1 is a plan view of a milk cooling apparatus constructed in accordance with my invention;

Figure 2 is a vertical sectional view therethrough;

Figure 3 is a section on the line 3—3 of Figure 2.

Referring now more particularly to the drawings, the numeral 10 generally designates a receptacle for a cooling element, which may be a mixture of fluid and ice or a circulated refrigerant. This casing has downwardly and outwardly inclining side walls 11, in the upper end of which projects a vertical flange or collar 12. Through the side wall adjacent the lower and upper ends thereof are formed an inlet 13 and an outlet 14 respectively for use when a circulated refrigerant or fluid is employed. The numeral 15 designates a cylindrical casing of less external diameter than the diameter of the mouth 16 of the receptacle 10, and this chamber has in its side wall adjacent its upper end screened outlets 16ª.

The bottom of the chamber 15 is provided with small caster wheels 17 or other means for providing an anti-friction support engaging with a reinforced seat 18 formed upon the interior of the bottom of the casing 10 centrally thereof. Upon the wall of the chamber adjacent its lower end and at the exterior thereof are provided outwardly extending ribs or vanes 19, the purpose of which will hereinafter appear.

Surrounding the upper end of the chamber wall in spaced relation thereto is an annular wall 20 which, at its lower end, is connected to the chamber wall beneath the outlets 16ª thereof by an upwardly and inwardly inclining bottom wall 21. This wall, at a point spaced from its outer edge and accordingly from its lowermost point, has formed therein an annular series of minute openings 22 which, when the chamber is in position in the receptacle 10, overlie the outer wall 11 at the upper end thereof to discharge upon said outer wall. The walls 20 and 21 combine with the chamber to form upon the exterior of this chamber an annular outlet chamber which discharges upon the outer wall, as above described. The bottom wall 21 has depending therefrom a flange or collar 23 which exteriorly fits the flange or collar 12 of the receptacle to assist in maintaining the chamber 15 centrally disposed therein. Upon the outer wall 20 of the discharge chamber, handles 24 are provided as a convenient means for rotating the chamber 15. By rotating the chamber 15, the vanes 19 serve to agitate the contents of the receptacle 10 and circulate the same, causing an increased refrigerating action thereby.

Means are provided for introducing milk to the chambers 15 at the lower end thereof.

These means include a strainer 25 in the form of an open-topped tubular container having adjacent to but spaced from its lower end screened outlets 26.

The outer wall of the container 25 above the outlets 26 is provided with an exteriorly disposed annular false wall 27 and the space between the false wall and the wall of the container is filled with heat insulation, generally designated at 28. This heat insulation serves not only to insulate milk disposed interiorly of the container from milk disposed exteriorly thereof but also serves to reduce the upwardly flowing stream of milk passing to the outlet 16ª of the chamber 15 to a thin stratum which is rapidly acted upon by the cooled outer wall of the chamber 15 to reduce the temperature thereof. The upper end of the container is provided with an outwardly extending flange 28ª, which seats upon the upper end of the chamber wall and is flanged, as at 29, to insure the central disposition of the container. A cover 29ª is provided having a central depression 30 which is circular in cross section and of less diameter than the internal diameter of the container 25. The lower end of this depression is closed, as at 31, and the side wall thereof adjacent this lower end but spaced therefrom is provided with screened outlets 32. The cover is exteriorly provided with a rim 33, which projects both above and below the cover, so that the cover of itself acts as a receptacle. This rim additionally fits against the upper end of the wall 20 of the discharge chamber and serves to hold the central depression 31 of the cover in its proper position. The cover may be provided with screened openings 34 communicating with the discharge compartment and with handles 35 whereby it may be manipulated.

In the use of the apparatus, the receptacle 10 is preferably placed in a distributing pan 36 having outlets 37 which may be placed to discharge into the mouths of milk cans (not herein disclosed) and the chamber 15, strainer 25 and cover 29ª placed in position.

Milk is introduced to the receptacle by pouring the same into the central pocket 30 of the cover and passes through the outlets 32 thereof to the strainer 25. From the strainer 25, it passes through the outlets 26 at the lower end thereof and moving upwardly in the space between the strainer and the chamber wall passes through the outlets 16ª of the chamber wall to the discharge compartment. From this compartment, it is discharged through the openings 22 against the outer wall 11 of the receptacle 10 adjacent the upper end thereof, so that milk in its passage twice engages against a wall which is subjected to the action of a cooling medium disposed within the receptacle. Attention is directed to the fact that in its passage, the milk is thrice subjected to a settling operation, passing over traps 38, 39 and 40 formed in the cover pocket, the strainer 25 and the discharge compartment respectively, so that all solids will be removed therefrom. Additionally, the chamber 15 will act as a settling chamber at all times.

It will be obvious that any milk left within the chamber 15 and strainer 25 will be rapidly cooled, so that when the next bucket of warm milk is poured into the device, this cooled milk will be the first to pass to the outlets and be discharged. Due to the construction, milk may be passed through the apparatus with considerable rapidity and, at the same time, will be cooled to the necessary extent.

The structure may be very readily cleaned and may be economically produced. In such production, it is preferred that all edges as of the rim 33, flanges 23, 29 and 12 and the upper ends of the walls 20 and 15 be beaded, as indicated at 41.

Since the construction hereinbefore set forth is capable of a certain range of change and modification without materially departing from the spirit of the invention, I do not limit myself to such specific structure except as hereinafter claimed.

I claim :—

1. In fluid straining and cooling apparatus, a cooling element receptacle having an outer wall and an open top, an open topped chamber extending into the receptacle through the open top thereof and having outlets near its upper end, means combining with the upper end of the chamber to produce an outlet compartment upon the upper end thereof, said outlet compartment having outlet openings discharging the fluid against the upper end of the exterior wall of the receptacle, and a strainer extending into the chamber through the open top thereof to a point adjacent the lower end of the chamber, said strainer having outlets adjacent its lower end and having an open top whereby fluid may be introduced therethrough and admitted at the lower end of the chamber.

2. In fluid straining and cooling apparatus, a cooling element receptacle having an outer wall and an open top, a chamber extending into the receptacle through the open top thereof and having outlets near its upper end, and a strainer extending into the chamber to a point adjacent the lower end thereof and having outlets adjacent its lower end, said strainer having an exteriorly applied heat insulation extending from a point above the outlets thereof to a point adjacent the level of the outlets of the chamber and means for admitting fluid to the chamber at the lower end thereof.

3. In fluid straining and cooling apparatus, a cooling element receptacle having an outer wall and an open top, an open topped chamber extending into the receptacle through the open top thereof and having outlets near its upper end, means combining with the upper end of the chamber to produce an outlet compartment upon the upper end thereof, said outlet compartment having outlet openings discharging the fluid against the upper end of the exterior wall of the receptacle, and a strainer extending into the chamber through the open top thereof to a point adjacent the lower end of the chamber, said strainer having outlets adjacent its lower end and having an open top whereby fluid may be introduced therethrough and admitted at the lower end of the chamber, said strainer having an exteriorly applied heat insulation extending from a point above the outlets thereof to a point adjacent the level of the outlets of the chamber.

In testimony whereof I hereunto affix my signature.

JAMES RILEY DAVIS.